United States Patent [19]

Clift

[11] Patent Number: 4,654,638
[45] Date of Patent: Mar. 31, 1987

[54] SECURITY MONITORING SYSTEM

[75] Inventor: Bruce G. Clift, Victoria, Australia

[73] Assignee: Cadin Electronics Pty. Ltd., Burwood, Australia

[21] Appl. No.: 782,199

[22] Filed: Sep. 30, 1985

Related U.S. Application Data

[63] Continuation of Ser. No. 261,765, May 8, 1981, abandoned, which is a continuation of Ser. No. 78,007, Sep. 24, 1979, abandoned.

[30] Foreign Application Priority Data

Sep. 28, 1978 [AU] Australia .............................. PD6152

[51] Int. Cl.⁴ .............................................. G08B 1/00
[52] U.S. Cl. ................................... 340/531; 340/506; 340/518; 340/525
[58] Field of Search ............... 340/531, 534, 506, 518, 340/505, 525, 825.27, 825.44, 825.06–825.12, 825.32, 825.36, 825.55, 825.54; 179/5 R, 5 P, 5.5, 6 R; 364/107, 558

[56] References Cited

U.S. PATENT DOCUMENTS

| | | | |
|---|---|---|---|
| 3,937,889 | 2/1976 | Bell, III et al. | 340/531 |
| 3,944,724 | 3/1976 | Kilby et al. | 340/825.44 |
| 3,958,240 | 5/1976 | Richardson | 340/518 |
| 4,006,460 | 2/1977 | Hewitt et al. | 340/511 |
| 4,040,013 | 8/1977 | Carlson | 340/518 |
| 4,086,434 | 4/1978 | Bocchi | 179/5 R |
| 4,168,494 | 9/1979 | Hummel et al. | 340/531 |

FOREIGN PATENT DOCUMENTS 0258873  6/1964  Australia .
1510518  5/1978  United Kingdom .

Primary Examiner—Donnie L. Crosland
Attorney, Agent, or Firm—Lane & Aitken

[57] ABSTRACT

A monitoring system of the type suitable for use in monitoring signals from security installations or networks includes a central control station serving a plurality of users and to which the users are connected by an existing telephone network or some other form of direct or switched line connection. Each user is provided with an encoder in the form of a combined control unit and digital telephone dialler, said encoder being programmed with information concerning each user in principally alphabetical character form to increase the likelihood that the message will be received and understood even in the event that certain characters contained in the message are missing. The control station is equipped with means for receiving and decoding the message transmitted from the user's control unit together with visual display means, such as a VDU or line printer, for visually displaying the received message. The system embodying the invention removes the need for card file systems or expensive computers and improves the reliability of the system by the use of principally alphabetical characters.

4 Claims, 2 Drawing Figures

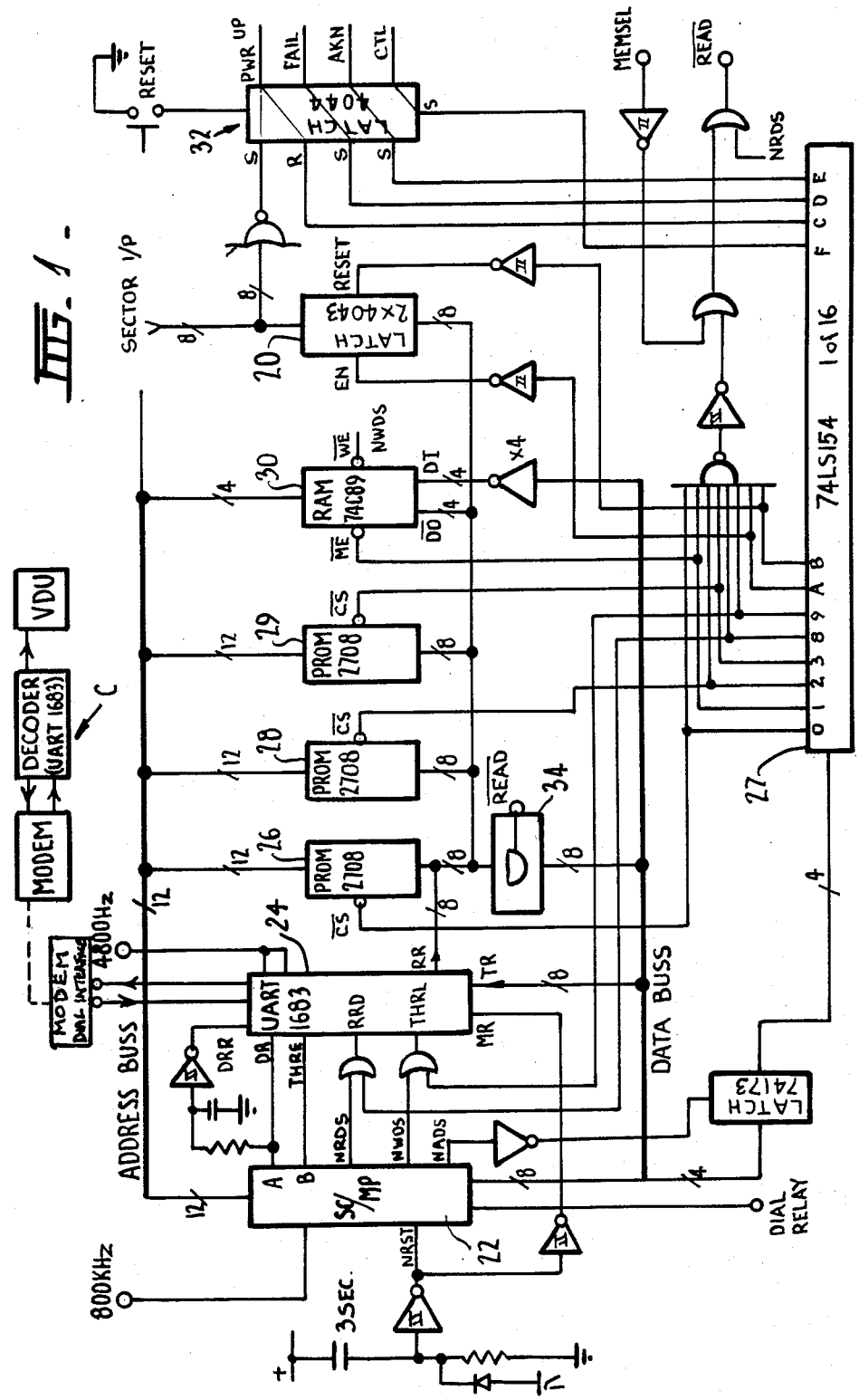

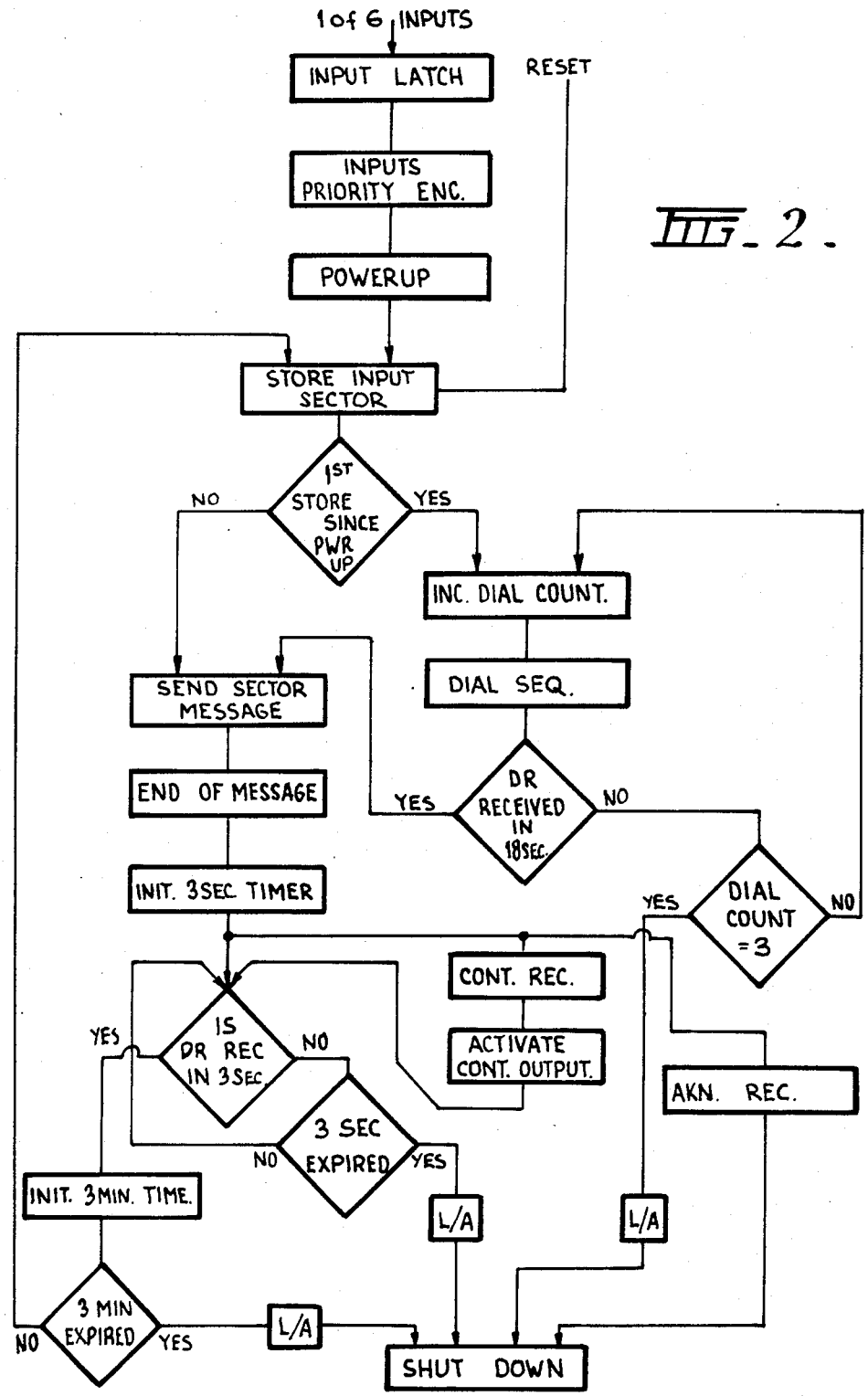
FIG_2.

SECURITY MONITORING SYSTEM

This application is a continuation of application Ser. No. 261,765, filed May 8, 1981, now abandoned, which is a continuation of application Ser. No. 78,007, filed Sept. 24, 1979, now abandoned.

This invention relates to monitoring systems of the type suitable for use in monitoring signals from security installations or networks.

At the present time an increasing number of security alarms are being installed in private and business premises to protect them against fire, burglary and the like. In many cases the alarm output is connected either directly or via the telephone network to a central alarm monitoring station which may handle hundreds of different users.

Directly connected systems which activate an indicator signifying that a particular user requires attention are restricted by the number of indicators that can be installed at any one central control station. Devices which automatically dial the monitoring station in the event of an alarm and transmit a user identification number are similarly restricted by the need to store information associated with each user identification number.

Known digital dialling devices transmit information in the form of user identification numbers and in some cases sector and testing information to a central station. The number of customers and the number of sectors and test facilities determine the word length and format to be transmitted to the decoder. It is therefore very difficult to arrive at a set word format which satisfies ninety percent of the users.

When the user identification number is received at the control station it must then be referred to a filing system which may be either a manual card file, or in very elaborate systems, a computer with a very large memory capacity. The appropriate information relating to the particular user identification number is retrieved and acted upon.

In order to automate a central station of the above type, it is necessary to install a decoder with a digital display and hard copy printer, a computer filing system incorporating a floppy disc or other high volume memory capacity, and a video display terminal for interfacing the computer to the control station operator. These requirements are very costly (of the order of $15,000 to $20,000) and the complexity of the system can be rendered totally useless if the wrong number is received or acted upon. Wrong numbers can occur either in the data reception or in the data retrieval from either the card file or the computer file system.

For example in the system described in Australian Pat. No. 258,873 to Brennon, the user identification number is transmitted to the central station and punched on a tape. If an error occurs in the transmission of the signal, for example due to spurious pulses or other interference, the received number is rendered virtually useless. Furthermore, in the system described in the above patent, the identification code is stored on a magnetic tape and this introduces the further possibility of a mechanical failure in the tape control unit.

The system described in U.K. Pat. No. 1,510,518 utilises a computer and has the cost and failure disadvantages referred to above.

It is the object of the present invention to provide a monitoring system which enables a large number of users to utilise a central control station without the need for manual or computer memory filing systems and which is less likely to result in errors being made.

In its broadest aspect the present invention provides a system for monitoring security alarm or like events of the type comprising a central monitoring means serving one or more users and means associated with each user for transmitting to the central monitoring means information relating to the user when an event of the type being monitored occurs, characterised in that said means associated with the or each user includes an encoder means preprogrammed with information concerning said user, a significant part of said information being encoded in alphabetical character form, said central monitoring means including a decoder means for receiving and decoding said encoded information and a video display means for displaying said decoded information to enable suitable action to be taken.

In the above system all information concerning the user, including any necessary instructions to the central control station, is preprogrammed at the user's end rather than at the central station. This removes the possibility of operator or computer error resulting from incomplete or misread code numbers. Furthermore, since a significant part of the information is in the form of alphabetical characters, there is less likelihood of an error occurring in the interpretation of the information, even in the event of some of the characters being missing. The information is preferably programmed in ASCII format to maintain compatibility with existing computer interface equipment.

It will be appreciated that since the central control station does not need a card file system or a computer memory system, the cost of the total system is substantially reduced. Although the system embodying the invention effectively divides the memory system usually required at the central control station amongst the users, this is still far less expensive than sharing the cost of a computer having the required memory capacity. It is envisaged that the addition of a programmable encoder to an alarm system will not significantly alter the cost of the alarm system.

The information programmed into the encoder will include interrogation, handshake and acknowledgement information as well as the message instructing the central control operator of the actions to be taken in the event of an alarm.

The number of users connected to a switched network system, such as a telephone system, will be unlimited while the number of users on a direct line system will be determined by the capacity of the line concentrators at the central control station and the number of incoming lines.

In a practical embodiment of the invention, the encoder may be a combined control unit and a digital dialler in order to reduce the overall cost of the system. By incorporating both functions in a single unit, it is possible to share some of the more expensive items, such as, power supply and standby battery, metal work, connectors, cabling and tamper proofing. The encoder will be made as flexible as possible so as to suit ninety percent of users' requirements. It is envisaged that the encoder will have add-on individual sector ability to enable the encoder to be expanded in capability.

The decoder may comprise a typical telecom line modem connected to a video display unit and may have facility for cassette recording and/or connections for a commercial page printer.

One preferred form of monitoring system embodying the invention is shown in the accompanying drawings in which:

FIG. 1 is a block diagram of a preferred central monitoring unit and dialler/control unit connected to the user's alarm system, and FIG. 2 is a flow chart explaining one mode of operation of the control unit.

In the preferred embodiment of the control system shown in FIG. 1, the user's alarm systems (not shown) are connected to an 8 input latch 20. In FIG. 1, the multiple parallel inputs and outputs of some of the components have been symbolically illustrated by a single line having a short oblique slash mark drawn thereacross and an adjacent member to indicate the proper number of inputs and/or outputs. For example, in the case of the latch 74173 shown in the lower left portion of FIG. 1 (which latch is a standardized component having four inputs and outputs) the inputs and outputs have been shown as a single line with the aforementioned oblique slash mark drawn thereacross and the adjacent numeral 4 to indicate the correct number of inputs and outputs. In the present embodiment six of the inputs SECTOR I/P are connected to six different sector alarms, for example, a fire alarm, one or more intrusion detectors, a power shut-down alarm, a refrigerator failure alarm and the like. The remaining two inputs are reserved for interrogation and testing functions.

The dialler/control unit is controlled by a microprocessor 22, which in the present embodiment is an SC/MP type, driven by an 800 kHz clock pulse derived from a suitable source (not shown). The microprocessor 22 is operatively connected to a dial relay to open and close the contacts thereof to simulate the required dialling sequence of the central monitoring unit indicated schematically at C. A telephone connected to a subscriber network is connected to a UART 24 which provides the necessary interface between the microprocessor 22 and the telephone line. The UART 24 is driven by a 4800 Hz clock pulse, again derived from a suitable source (which may be the same source from which the 800 kHz clock is derived). The UART 24 is also connected to the data buss of the system so that the necessary data may be transmitted via the telephone line to the central monitoring unit C, as will be described in more detail below. In the preferred form shown, the data to be transmitted via the telephone line is, before transmission, passed through a known frequency shift keying generator to improve the efficiency of transmission of the data signals.

The microprocessor 22 has several peripheral devices connected by the address buss of the system to its input terminals. The peripheral devices include a first programmable read only memory (PROM) 26 which is programmed in accordance with the flow chart of FIG. 2, or with any other desired set of constructions, to cause the microprocessor 22 to perform the necessary functions. A second PROM 28 is programmed with the text of the message to be transmitted in the event of one or more of the alarms being activated. A third PROM 29 is available in case the user requires further message capacity. A random access memory (RAM) 30 is used to momentarily store operational information beyond the capacity of the microprocessor 22. This device is commonly called a "scratch pad".

A 1 of 16 decoder latch 27 is connected to the peripheral devices 26, 28, 29 and 30 and to a 4 bit control latch 32 which is in turn operated by the sector inputs SECTOR I/P. A read gate 34 is provided to ensure that the peripheral devices are connected to the data buss whenever the microprocessor 22 transmits a read strobe signal (NRDS).

The terminal labelled MEMSEL is a memory select terminal which is connected to a development system for debugging during manufacture or servicing. All other integers of the dialler/control unit will be self-explanatory to a person skilled in the art having regard to the SC/MP manufacturers handbook. The part numbers shown in FIG. 1 are typical but should not be regarded as being in any way essential.

The central monitoring means or control station C includes a decoder connected to a telephone at the station by a known modem, and a visual display unit VDU. The decoder, which in the present embodiment is a UART similar to UART 24, is programmed to send a data request signal over the telephone line as soon as it receives a call from one of the users. The decoder is also programmed to send a further data request signal at the end of any message received from the user's encoder to ensure that all sectors are properly covered. The decoder and video display unit are standard commercially available devices and no further description thereof is required.

A typical mode of operation of the system embodying the invention is as follows. In the event of activation of one of the sector alarms, the respective one of the input latches 20 receives a 100 mS pulse (SECTOR I/P) causing the "power-up" section of control latch 32 to latch. The microprocessor 22, under the control of PROM 26 (see flow chart of FIG. 2), is powered-up and information regarding the active sector is stored in one of its registers. The microprocessor 22 resets the input latch and begins the dial sequence thereby causing the unit to dial the number of the control station.

At the end of the dial sequence, the microprocessor 22 waits for a data request from the decoder at the control station and if a request is not received in eighteen seconds, the microprocessor 22 will cause disconnection of the telephone line and will recommence the dial sequence. This procedure will be repeated three times following which the encoder will shut down.

If a data request is received from the control station, the message stored in PROM 28 is transmitted to the control station decoder and is displayed on the visual display unit whereupon the control station operator takes the necessary action. It is envisaged that the PROM 28 will include a general message in ASCII format including the name and address of the user and one or more sector messages including the name of the active sector and the instructions relevant to that particular sector.

Following transmission of the message, the microprocessor 22 waits for a further data request for a period of three seconds and if no data request is received, the unit will be shut down.

If a further data request is received, the microprocessor will search the input sector latches for any further sector activity and if an active latch is detected it will store the sector information in its register and initiate the same sequence as described above for that sector. If no active sectors are located, the microprocessor 22 will wait approximately three minutes and will then shut down.

During the wait period, if a further sector latch is activated the procedure is repeated once again. During this period, the decoder sends a data request signal about every ten seconds to keep the microprocessor in its latch search mode.

If the control station operator does not wish to wait for the above period, the system may be shut down by the activation of an acknowledgement button at the decoder. If an acknowledgement signal is received by the microprocessor, the system is automatically shut down.

The decoder is also equipped to transmit a control signal at the operator's option. The receipt of a control signal by the microprocessor 22 causes an output from the encoder which may be used to perform any control function. In the case of a security system for example it may be used to bring on the local alarm.

It will be appreciated that other modes of operation of the encoder may be used with equal effectiveness. However, the above described mode is presently preferred since it ensures that the encoder is thoroughly interrogated before the system is shut down.

In conclusion, the major advantages of the monitoring system embodying the present invention are as follows:

(1) No computer is required.
(2) No expensive number decoder is required.
(3) No card file system is required.
(4) All information transmitted to the central control station is principally in alphabetical characters, preferably in ASCII format thereby reducing the likelihood of transmission and interpretational errors.

What is claimed is:

1. A method for monitoring a plurality of user stations with a central monitoring means comprising the first step of providing a security monitoring system comprising a central monitoring means, a plurality of user stations, a communication means connecting each of said user stations to said monitoring means and a single storage capacity consisting of memories located at said user stations, said storage capacity being for storing preprogrammed information specific to individual user stations in a substantially alphabetical character form arranged to spell at least one word sufficient to identify at least a particular one of said user stations, said preprogrammed information being all that is necessary to make said identification, each of said user stations comprising (a) a memory for storing a portion of said preprogrammed information that relates to a particular one of said user stations with which said memory is associated and an event of the type being monitored, wherein said storage capacity is contained within said memories and all of said preprogrammed information is contained within said storage capacity and (b) a transmitter for transmitting said portion of said preprogrammed information to said monitoring means in an electrically transmissible format, said monitoring means comprising (a) a receiver for receiving portions of said preprogrammed information in said transmissible format, (b) a decoder for decoding a portion of said preprogrammed information in said transmissible format into said at least one word, and (c) a video display means for displaying said at least one word, a second step of encoding a portion of said preprogrammed information specific to each individual user station into respective memories of each of said user stations in a substantially alphabetical character form arranged to spell at least one word sufficient to identify at least a particular one of said user stations, a third step of actuating at least one of said transmitters and transmitting at least one of said portions of preprogrammed information in an electronically transmissible format to said central monitoring means, a fourth step of receiving said at least one of said portions of said preprogrammed information at said central monitoring means in said electronically transmissible format, a fifth step of decoding said received portions of said preprogrammed information with said decoder into said at least one word, a sixth step of displaying said at least one word that has been decoded and making said identification solely on the basis of said at least one word that has been displayed.

2. The method of claim 1 wherein each of said user stations further comprises an encoder means that comprises a microprocessor, said memory connected to said microprocessor for controlling the operation of said microprocessor and for storing said portions of said preprogrammed information, and means for connecting said memory to said communication means, said method further comprising the step of controlling the operation of said microprocessor with said memory.

3. The method of claim 2 wherein said microprocessor is of the SC/MP type and said memory includes programmable read only memories for controlling the operation of the microprocessor and for storing said respective portion of information, said method further comprising the step of programming said read only memories to control said microprocessor.

4. The method of claim 1 wherein each of said user stations is adapted to sense at least one alarm condition to thus actuate said transmitting means, said method further comprising the steps of sensing at least one of said alarm conditions and actuating at least one of said transmitters by said sensing.

* * * * *